Dec. 22, 1925.
J. F. MacKAY ET AL
1,567,006
INCUBATOR
Original Filed Sept. 21, 1921    2 Sheets-Sheet 1
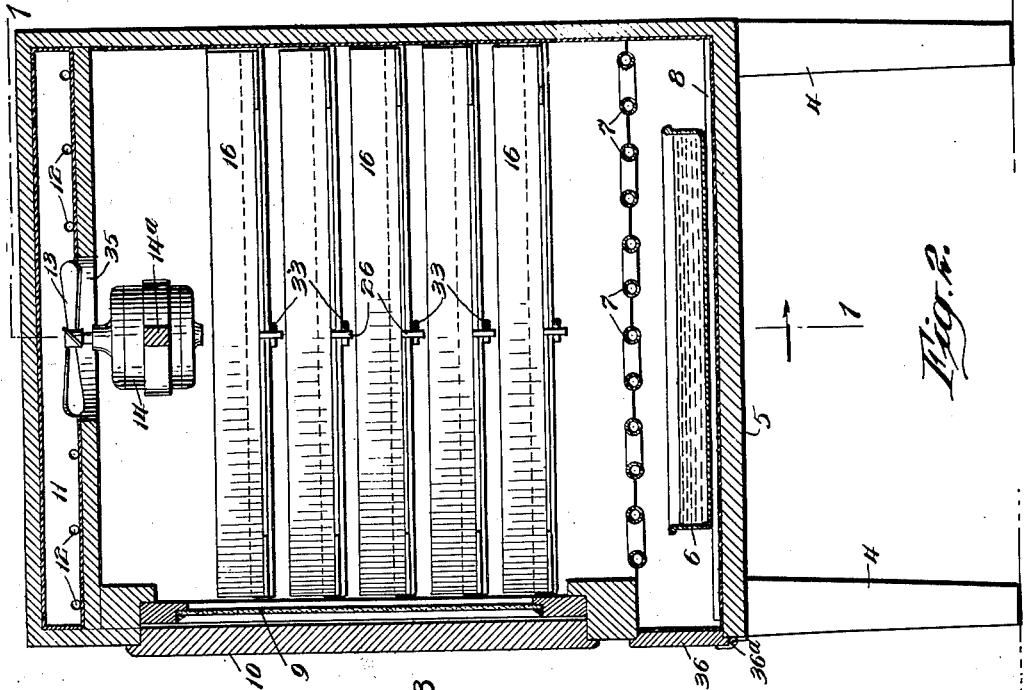
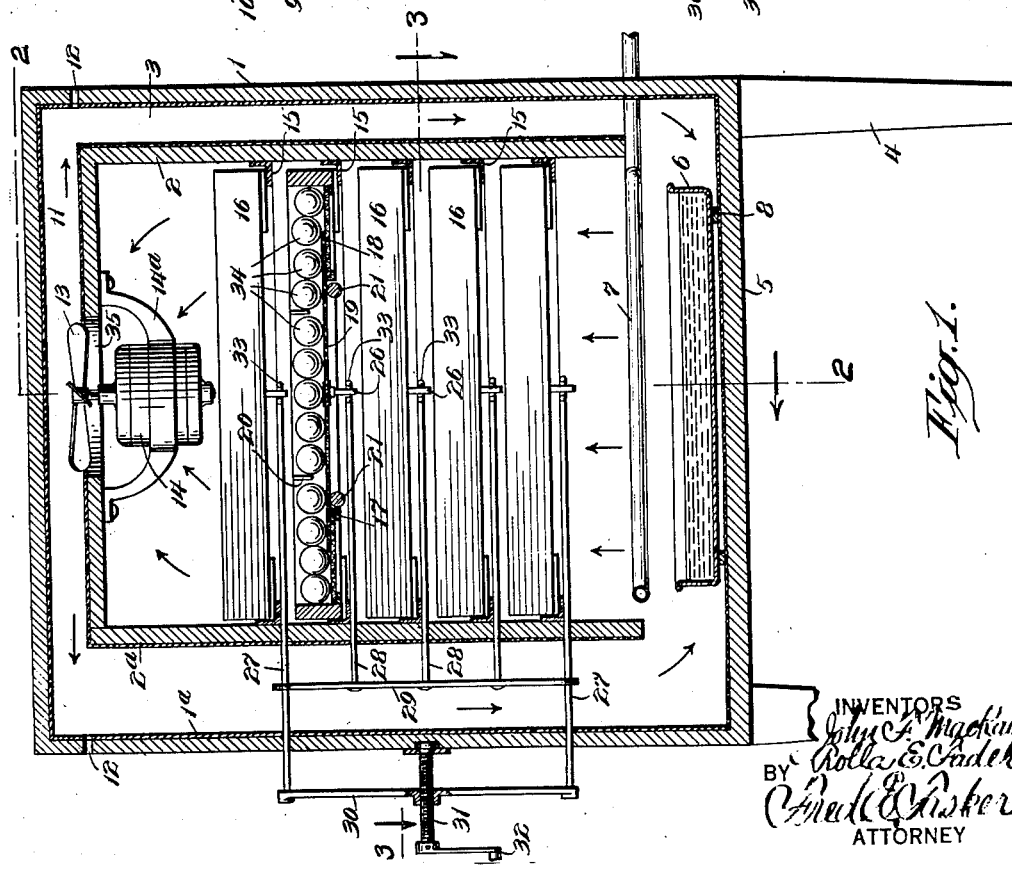
INVENTORS
John F. Mackay
Rolla E. Cader
BY
Fred E. Fisher
ATTORNEY Dec. 22, 1925.  1,567,006
J. F. MacKAY ET AL
INCUBATOR
Original Filed Sept. 21, 1921   2 Sheets-Sheet 2

INVENTORS
John F. MacKay
BY Rolla E. Sader
Fred A. Asker
ATTORNEY

Patented Dec. 22, 1925.

1,567,006

UNITED STATES PATENT OFFICE.

JOHN F. MacKAY, OF LANCASTER, PENNSYLVANIA, AND ROLLA E. FADER, OF NORWALK, OHIO.

INCUBATOR.

Application filed September 21, 1921, Serial No. 502,139. Renewed March 25, 1925.

*To all whom it may concern:*

Be it known that we, JOHN F. MACKAY and ROLLA E. FADER, citizens of the United States, and residents, respectively, of Lancaster and Norwalk, in the counties of Lancaster and Huron and States of Pennsylvania and Ohio, have invented certain new and useful Improvements in Incubators, of which the following is a specification, reference being had therein to the accompanying drawing.

Our invention relates to certain new and useful improvements in incubators for artificially hatching chicks in the chicken industry. The object is to simplify and perfect the apparatus of this class, so that the same may be under more perfect control and regulation and so that the temperature may be kept even and uniform and alike for all the eggs, and that effective regulative adjustments may be made with facility from time to time as may be required and a circulation of warm air throughout all the chambers and spaces of the apparatus may be continuous and productive of the best results. With these and other objects in view, the invention may be said to consist essentially in the construction, arrangement and combination of parts, substantially as will be hereinafter described and claimed.

In the accompanying drawing, illustrating our invention:

Figure 1 is a vertical section of our improved incubator, on the line 1, 1, of Figure 2.

Figure 2 is a vertical section of the same at right angles to the section of Figure 1 and on the line 2, 2, of Figure 1.

Similar characters of reference designate like parts throughout the different figures of the drawing.

Figure 3:
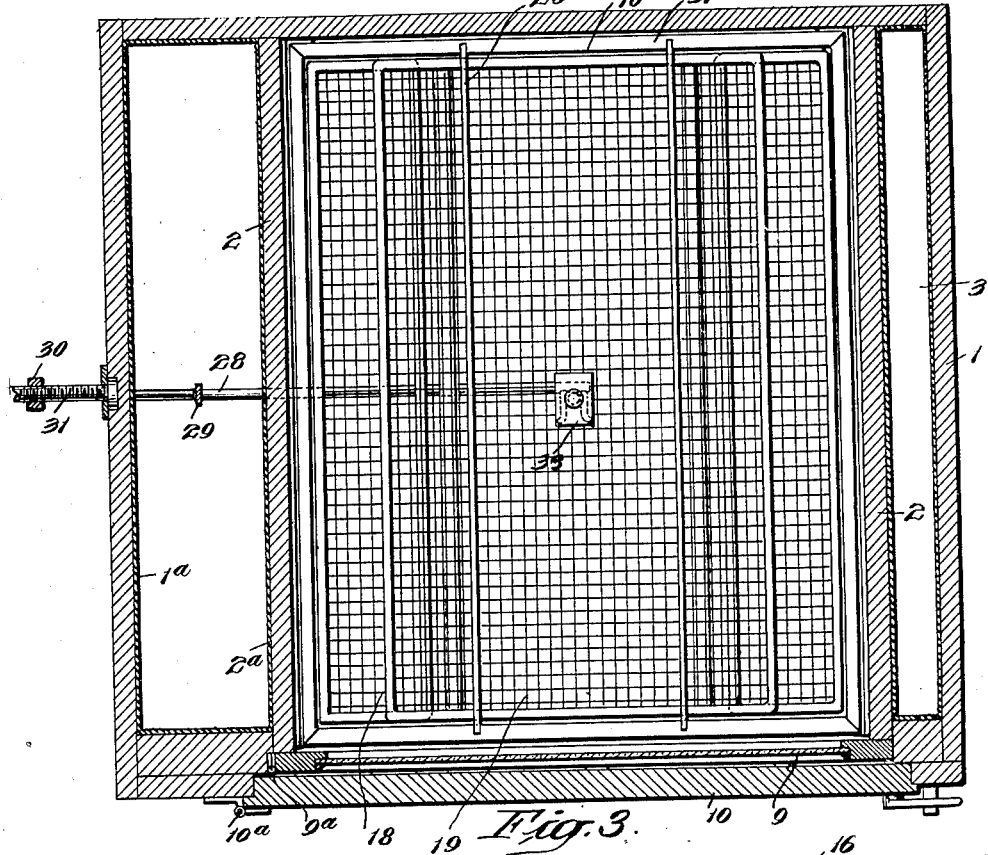
Figure 3 is an enlarged horizontal plan view, partly in section on the line 3, 3, of Figure 1.

The essential structure of the frame is supported on feet 4 and comprises an outer casing 1 and an inner casing 2, between which are side spaces 3 and a top space 11, that are in communication with each other, said side spaces also communicating at their bottom ends with the bottom interior of the inner casing 2. The outer casing 1 is lined interiorly, or covered outside or in, or both, with an insulation or covering of asbestos or similar material 1ª, so that the heat will be retained; and the inner casing 2 is similarly provided with an insulation coating or covering 2ª. In the top of the inner casing 2 is a circular opening 35, in which is mounted a fan or blower 13, driven by an electric or other motor 14 supported by a bracket 14ª. Obviously the fan or blower may be actuated in any desired manner, its purpose being to draw the warm air up through the inner chamber and through the eggs. The air thus taken up from the inner chamber is delivered into the top space 11 and the current thereof is deflected therein in both directions over into the vertical side spaces 3 through which it travels downwardly to the lower part of the apparatus where it again enters the bottom of the inner chamber and is drawn upwardly again therein, all as shown by the arrows in the drawing. In the bottom of the apparatus below the inner chamber are suitable heating coils 7 and a moisture pan 6, the latter resting on cleats 8 on the floor 5, and the former being arranged above the pan 6, and receiving hot water or the like from some suitable source of supply. The top space 11 is provided with a suitable number of openings or perforations 12 for the admission of fresh air for ventilation.

The inner chamber 2 is fitted with a door 9, hinged at 9ª, and preferably provided with glass so that the contents of the chamber may be readily inspected; and the outer chamber is provided with a door 10 hinged at 10ª, and preferably solid and located opposite to and closely adjacent to the glass door 9 so as to cover and protect the same. The lower part of the casing 1 is furnished with a door 36, hinged at 36ª which gives convenient access to the moisture pan 6.

Within the inner chamber or casing 2 we place a plurality of egg trays 16, containing eggs, as 34. These trays are arranged closely one above another allowing just enough clearance for the eggs, and they slide easily in and out on the horizontal side ledges or cleats 15 which are secured on the inside surface of the wall of casing 2. Thus there may be as many trays 16 as the space within casing 2 will accommodate and the hot air drawn upwardly by the fan from the heating pipes comes into contact with all the eggs in a uniform manner and effectively promotes the incubation process.

Figure 4:
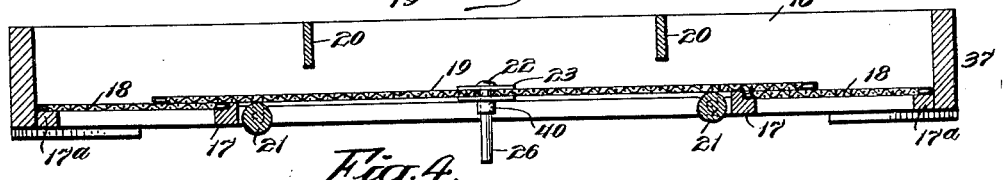
Figure 4 is an enlarged cross-section of one of the egg trays.
Figure 5:
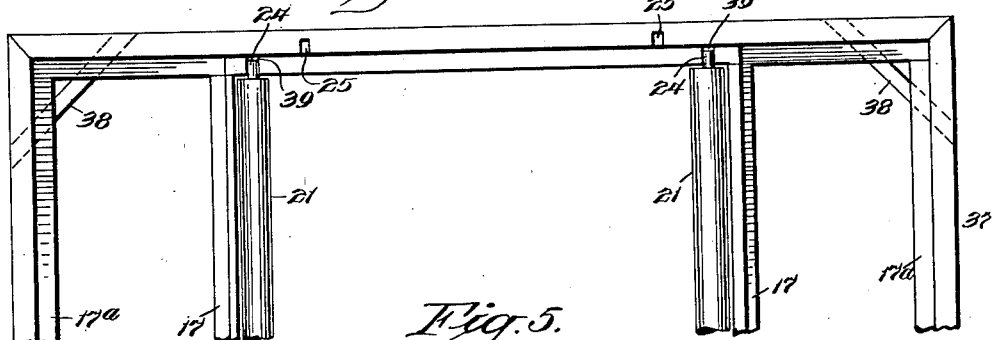
Figure 5 is a broken plan view of the same with the bottom sections removed.

The trays 16 are constructed in the manner shown in detail in Figures 4 and 5. There is a main rectangular or square frame 37, braced at the corners at 38, said frame 37 having suitable side walls connected at the bottom by horizontal rails 17 and 17ª which support the sections of the tray bottom. This bottom is usually made in three sections, two of which, as 18, are placed removably on the rails 17 and 17ª, at the sides of the tray, the rails 17 being rebated as shown to hold said sections more firmly and keep them in place; and the middle and third section 19 which is usually larger than the others and overlaps them and slides thereon. All these sections are preferably of wire gauze, wire mesh, sieve material, or other open work, so that the warm air may readily pass through and come into contact with the superposed eggs on all sides of the same. To assist the central sliding section 19 in its movements we mount it not only on the relatively fixed sections 18 but we insert beneath it a pair of rollers 21 close to the rails 17, said rollers having end journal pins 24 that loosely enter notches 39 in the sides of the tray frame 37, so that the rollers may be free to revolve as the sliding bottom is moved or adjusted back and forth, and may also be freely taken out of the tray when the parts are disassembled for cleaning or other purposes. Thus all the sections of the bottom can be quickly and easily removed or replaced.

The object of the movable bottom sections in the trays is to enable the eggs to be turned at proper periods, so as to expose all sides to the heat and otherwise regulate the incubation. It is necessary also in order to secure this turning result to have obstacles against which the eggs may contact when the bottom slides and to provide these we employ flat partitions or bars 20, the ends of which take into small notches or openings 25 in the sides of frame 37, from which the partitions can be readily removed in disassembling the parts. These partitions 20 are preferably somewhat above the bottom section 19 as seen in Figure 4. Thus all the parts of the tray can be taken apart.

The sliding sections 19 of several trays are operated simultaneously by connecting mechanism consisting of horizontal rods 27 and 28 running through passages or supports in the casings 1 and 2, one or both. The inner ends of rods 27 and 28 are forked or hooked at 33 to loosely engage pins 26 on sections 19. The rods 27 may be connected together and with rods 28 by a cross-piece 29 inside of space 3 and the outside ends of rods 27 by a cross-piece 30. A screw 31 having a handle 32 passes through a nut in cross-piece 30 and has a head carried loosely in a recess in wall of casing 1. The revolution of the screw reciprocates the rods 27 and 28 and moves the sliding sections 19 in one direction or the other so as to turn the eggs.

It will thus be clearly understood that by an easy manipulation of the screw handle the movable sections 19 of the egg trays can be adjusted in position so as to turn the eggs as may be required at intervals in the hatching operation, since the movement of the sections 19 presses the eggs against each other and against the partitions 20 and the sides of the trays and causes the eggs therefore to roll over and change their position. It is desirable to throw some of the trays out of service at times, as they may be filled with eggs at different times with different incubation periods, so that the periods of exposure of different trays may vary, and in order to do this we find it necessary to disconnect the operating leverage from some of the trays in the selective process of properly timing the exposure of each tray and changing the same for different positions of the eggs, to aid in uniform incubation; and one way of doing this is to arrange the pins 26 with which the sliding bottoms 19 are provided, so that they may drop loosely into the hooks or claws 33 on the ends of the operating rods 27 and 28, and hence they can be easily withdrawn from the claws and the bottoms whenever any tray is selected to be taken out of service or allowed to remain a longer time in the same position. Pins 26 have heads 22 and washers 23 and easily drop through a sleeve or socket 40 made fast in sections 19. These loose pins 26 are therefore of advantage in enabling the operator to select the trays in which the eggs are to be turned at any one time. The hooks or claws 33 usually open toward the front of the apparatus so that when desired the trays may be withdrawn through the front door, for the pins 26 can thus easily be made to slip out of the said hooks or claws 33.

Many changes may be made in the details of construction without exceeding the scope of our invention. The mechanism for shifting the position of the sliding tray bottom may be widely changed and substituted, and in general the embodiment of the invention may be modified as required to suit special cases within the limits of our claims.

Having thus described our invention what we claim as new and desire to secure by Letters Patent is:

1. An incubator comprising inner and outer casings affording intervening top and opposed side circulation spaces the latter communicating with the lower interior of the inner casing, a fan arranged in an opening at the top of the inner casing for creating a draft, heating means in the lower portion of the casings, and egg supporting means in the inner casing, all so arranged that heated air drawn upwardly is deflected through the circulation spaces back to the bottom of the incubator and up again.

2. An incubator comprising inner and outer casings between which is a top space having ventilation openings and side spaces leading downwardly into communication with the open-ended bottom of the inner casing, a fan arranged in an opening in the top of the inner casing for inducing a draft of warm air, heating coils below the inner casing, an underlying moisture pan, an egg supporting means in the inner casing, all arranged so that warm air may circulate continuously upwards about the eggs.

3. An incubator comprising inner and outer casings, between which is a top space and connecting side spaces leading downwardly into communication with the open-ended bottom of the inner casing, a suction fan, a motor therefor, a bracket supporting said fan and motor in an opening in the top of the inner casing, heating coils in the bottom of the incubator, and means for supporting eggs in the inner casing where they will be exposed to a continuous upward circulation of warm air.

4. An incubator comprising inner and outer casings affording a top and opposed side circulating spaces, and a fan arranged in an opening at the top of the inner casing for inducing a continuous draft upwardly through the inner chamber for divergent deflection through the top and side circulating spaces back to the bottom of the incubator.

5. The combination, in an incubator, of inner and outer casings affording a top and opposed side circulating spaces, said casings being lined with heat insulating material, a fan arranged in a central opening in the top of the inner casing, heating coils in close juxtaposition to the bottom of the inner casing, and egg supporting means in the inner casing, all arranged so that warm air is upwardly drawn through the inner casing and divergingly deflected in opposed directions downwardly through the side spaces to the bottom of the incubator, and back again.

6. The combination, in an incubator, of inner and outer casings affording a top and opposed side circulating spaces, said casings being lined with heat insulating material, a fan arranged in a central opening in the top of the inner casing, heating coils in close juxtaposition to the bottom of the inner casing, a moisture pan below said heating coils, and egg supporting means in the inner casing, all arranged so that warm air is continuously drawn upwardly through the inner casing and divergingly deflected in opposed directions downwardly through the side spaces to the bottom of the incubator.

7. In an incubator, the combination of inner and outer casings between which is a top space and connecting side spaces leading downwardly into communication with the open bottom of the inner casing, means affording ventilation to the top space, heating coils and a subjacent moisture pan immediately below the inner casing, and a suction fan concentric with the top of the inner casing for inducing an upward current of warm moist air therethrough for downward deflection back to the bottom of the incubator and recirculation, as aforesaid.

In testimony whereof we hereunto affix our signatures.

JOHN F. MacKAY.
ROLLA E. FADER.